United States Patent
Null et al.

(10) Patent No.: US 9,931,971 B1
(45) Date of Patent: Apr. 3, 2018

(54) SPREADER WITH REMOVABLE MATERIAL TRANSPORTATION MECHANISM

(71) Applicant: Alamo Group Inc., Seguin, TX (US)

(72) Inventors: Spencer J. Null, Kansas City, KS (US); Vladimir Feldman, Overland Park, KS (US); Douglas E. Metcalf, Olathe, KS (US); Robert W. Wood, Shawnee, KS (US); Randal M. Wolf, Tonganoxie, KS (US)

(73) Assignee: Alamo Group Inc., Seguin, TX (US)

( * ) Notice: Subject to any disclaimer, the term of this patent is extended or adjusted under 35 U.S.C. 154(b) by 409 days.

(21) Appl. No.: 14/698,391

(22) Filed: Apr. 28, 2015

Related U.S. Application Data

(60) Provisional application No. 61/987,281, filed on May 1, 2014.

(51) Int. Cl.
| | | |
|---|---|---|
| *A01C 3/06* | (2006.01) |
| *B60P 1/38* | (2006.01) |
| *A01M 9/00* | (2006.01) |
| *E01H 10/00* | (2006.01) |
| *E01C 19/20* | (2006.01) |
| *A01C 15/18* | (2006.01) |
| *B60P 1/36* | (2006.01) |
| *A01C 17/00* | (2006.01) |

(52) U.S. Cl.
CPC ............... *B60P 1/38* (2013.01); *A01C 15/18* (2013.01); *A01C 17/00* (2013.01); *A01M 9/0069* (2013.01); *B60P 1/36* (2013.01); *E01C 19/20* (2013.01); *E01C 19/203* (2013.01); *E01H 10/007* (2013.01)

(58) Field of Classification Search
CPC ... B60P 1/36; B60P 1/38; A01C 17/00; A01C 15/18; E01C 19/203; E01C 19/20; A01M 9/0069; E01H 10/007
USPC ........ 239/672, 663, 679, 681, 687; 414/523, 414/527, 528
See application file for complete search history.

(56) References Cited

U.S. PATENT DOCUMENTS

| | | | |
|---|---|---|---|
| 2,563,418 A | 8/1951 | Peter et al. |
| 2,784,854 A * | 3/1957 | Roberts | B60P 1/38 |
| | | | 414/528 |
| 3,090,515 A * | 5/1963 | Crowther | B60P 1/36 |
| | | | 414/528 |
| 3,559,894 A | 2/1971 | Murray et al. |
| 3,917,084 A | 11/1975 | Swisher, Jr. et al. |
| 4,253,612 A | 3/1981 | Schulze |
| 4,522,341 A | 6/1985 | Wall et al. |
| 6,557,944 B1 | 5/2003 | Connor |

(Continued)

*Primary Examiner* — Steven J Ganey
(74) *Attorney, Agent, or Firm* — Pizarro Allen PC

(57) ABSTRACT

A spreader assembly may include a hopper configured for receiving a spreadable material, a removable cartridge configured for sliding engagement with the hopper and having a material transportation mechanism configured for receiving the spreadable material from the hopper, and a spreader configured for receiving the spreadable material from the material transportation mechanism and spreading the spreadable material onto a target surface. One of the hopper and the cartridge may include a roller having a roller surface, and the other of the hopper and the cartridge may include a bearing surface configured for rolling engagement with the roller surface.

20 Claims, 10 Drawing Sheets

(56) References Cited

U.S. PATENT DOCUMENTS 6,698,997 B2 *  3/2004  Arne .................. B60P 1/28
                                                       239/672
6,817,551 B2   11/2004  Williams et al.

* cited by examiner

SPREADER WITH REMOVABLE MATERIAL TRANSPORTATION MECHANISM

CROSS REFERENCE TO RELATED APPLICATIONS

This application claims priority to U.S. Provisional Patent Application No. 61/987,281 filed May 1, 2014, the disclosure of which is incorporated herein by reference.

BACKGROUND

In certain fields such as roadway maintenance, farming, and ranching, it is often desireable to spread various spreadable materials, such as salt, sand, gravel, dirt, grain, seed, fertilizer, herbicides, pesticides, and other granular or particulate matter, for example, onto a target surface such as a roadway or piece of land. Equipment used for such spreading typically includes a hopper and a material transportation mechanism configured for feeding the spreadable material from the hopper to a spreader. One challenge for such equipment is that some spreadable materials may be quite corrosive to the equipment, thus necessitating frequent downtime for maintenance and repair. Another challenge for such equipment is that the preferred material transportation mechanism may vary from one spreadable material to another and one application to another, which again may cause undesired downtime between jobs in order to switch from one material transportation mechanism to another, or it may require the acquisition of completely different spreader assemblies. It would be a significant advancement in the art to provide a spreader assembly for which the material transportation mechanism is easily changed and which is less susceptible to damage from corrosion.

SUMMARY

In some embodiments of a system as described herein, a spreader assembly may include a hopper configured for receiving a spreadable material. The hopper may include at least one roller having a roller surface. A cartridge may be slidably and removably disposed in a lower portion of the hopper, and the cartridge may include at least one bearing surface configured for rolling engagement with the roller surface of the at least one roller. The cartridge may include a material transportation mechanism configured for receiving the spreadable material from the hopper and moving the spreadable material toward a spreader, which may receive the spreadable material from the material transportation mechanism and spread the spreadable material onto a target surface.

In some embodiments, the hopper may include a pair of spaced apart rails and a forward roller and a rear roller disposed within each of the rails. The cartridge may include a pair of spaced apart slides slidably disposed in the spaced apart rails, wherein each of the slides includes a bearing surface configured for engagement with the respective rollers.

In some embodiments, a spreader assembly may include a hopper configured for receiving a spreadable material and a cartridge configured for insertion into and removal from the hopper. The hopper may include a first rail having a first front roller and a first rear roller, and a second rail spaced apart from the first rail and having a second front roller and a second rear roller. Each of the rails may have a guide member. The cartridge may include a first slide having a first bearing surface configured for rolling engagement with the first front roller and the first rear roller, and a second slide having a second bearing surface configured for rolling engagement with the second front roller and the second rear roller. Each of the bearing surfaces may be non-horizontal, and each of the slides may have a flange configured to be received by one of the guide members. The cartridge may have a material transportation mechanism configured for receiving the spreadable material from the hopper, and a spreader may be configured for receiving the spreadable material from the material transportation mechanism and spreading the spreadable material onto a target surface. Each of the rails and the slides may comprise at least one ramp configured to facilitate the insertion and the removal. The cartridge may have a fully inserted position in which the cartridge is not engaged with the rollers and wherein front and rear portions of the cartridge respectively rest on non-horizontal front and rear rests of the hopper.

In some embodiments, a spreader assembly may include a hopper configured for receiving a spreadable material, a removable cartridge configured for sliding engagement with the hopper and having a material transportation mechanism configured for receiving the spreadable material from the hopper, and a spreader configured for receiving the spreadable material from the material transportation mechanism and spreading the spreadable material onto a target surface. One of the hopper and the cartridge may include a roller having a roller surface, and the other of the hopper and the cartridge may include a bearing surface configured for rolling engagement with the roller surface.

BRIEF DESCRIPTION OF THE DRAWINGS

An example of a system as described herein is shown in the accompanying drawings in which.

DETAILED DESCRIPTION

The following terms as used herein should be understood to have the indicated meanings unless the context requires otherwise.

When an item is introduced by "a" or "an," it should be understood to mean one or more of that item.

"Comprises" means includes but is not limited to.

"Comprising" means including but not limited to.

"Having" means including but not limited to.

As described in detail below, the present application is directed to a spreader assembly having a hopper and a removable material transportation cartridge that is useful for spreading various spreadable materials, such as salt, sand, gravel, dirt, grain, seed, fertilizer, herbicides, pesticides, and other granular or particulate matter, for example. Among other things, a spreader assembly as described herein may be beneficially used in various applications, such as sanding and salting of icy or snowy roadways, farming, ranching, and the like. As the material transportation cartridge is readily removable from the hopper, the material transportation cartridge may easily be removed for cleaning, maintenance, repair, or substitution of a different type of material transportation mechanism. For exemplary purposes, an embodiment of a spreader assembly is described as being mounted to a truck. Persons of ordinary skill in the art will understand that a spreader assembly as described herein may be mounted to any suitable wheeled vehicle, such as a trailer, tractor, or other type of prime mover.

Figure 1:
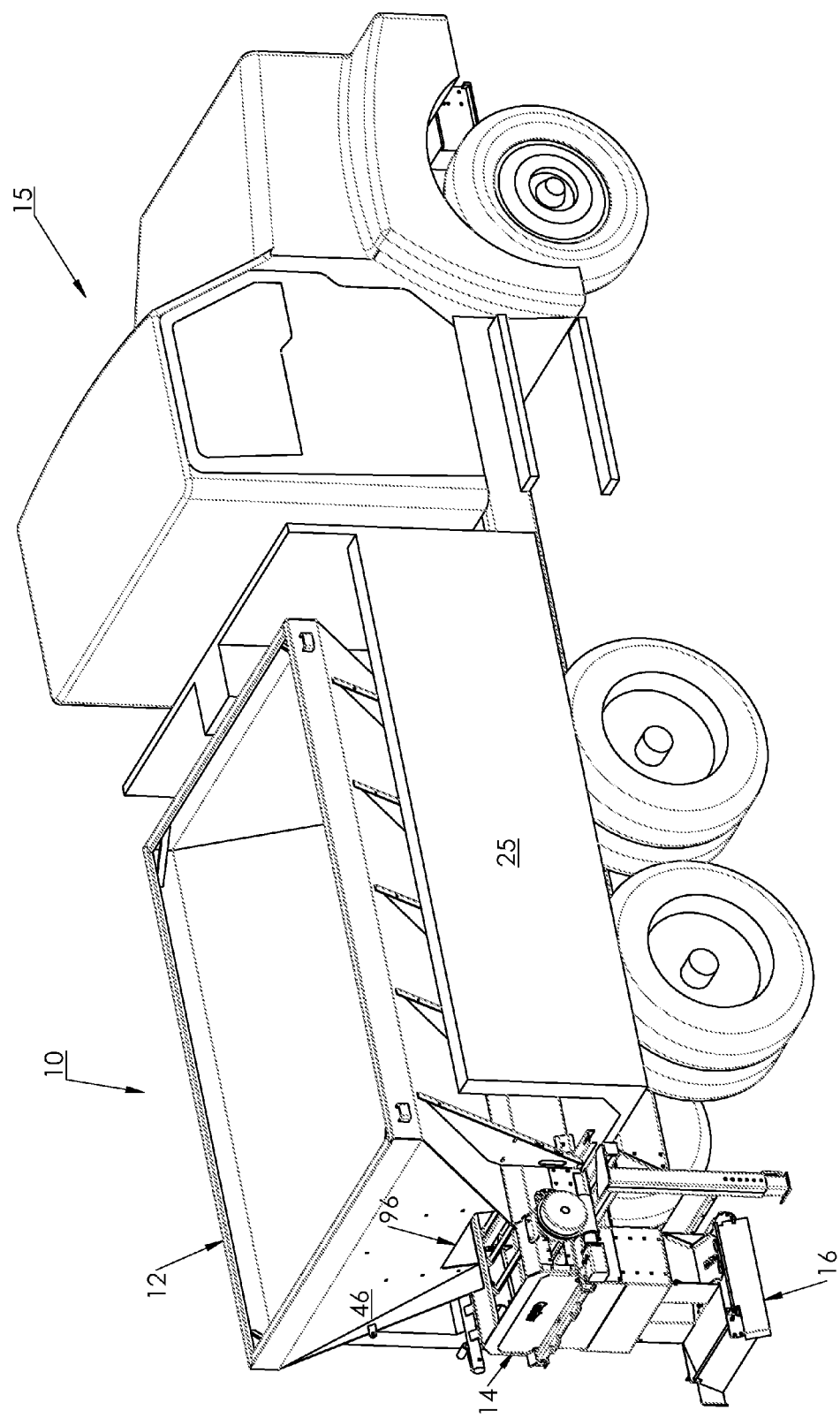
FIG. 1 is a rear perspective view of a spreader assembly having a removable material transportation cartridge disposed in a hopper mounted on a truck.
Figure 2:
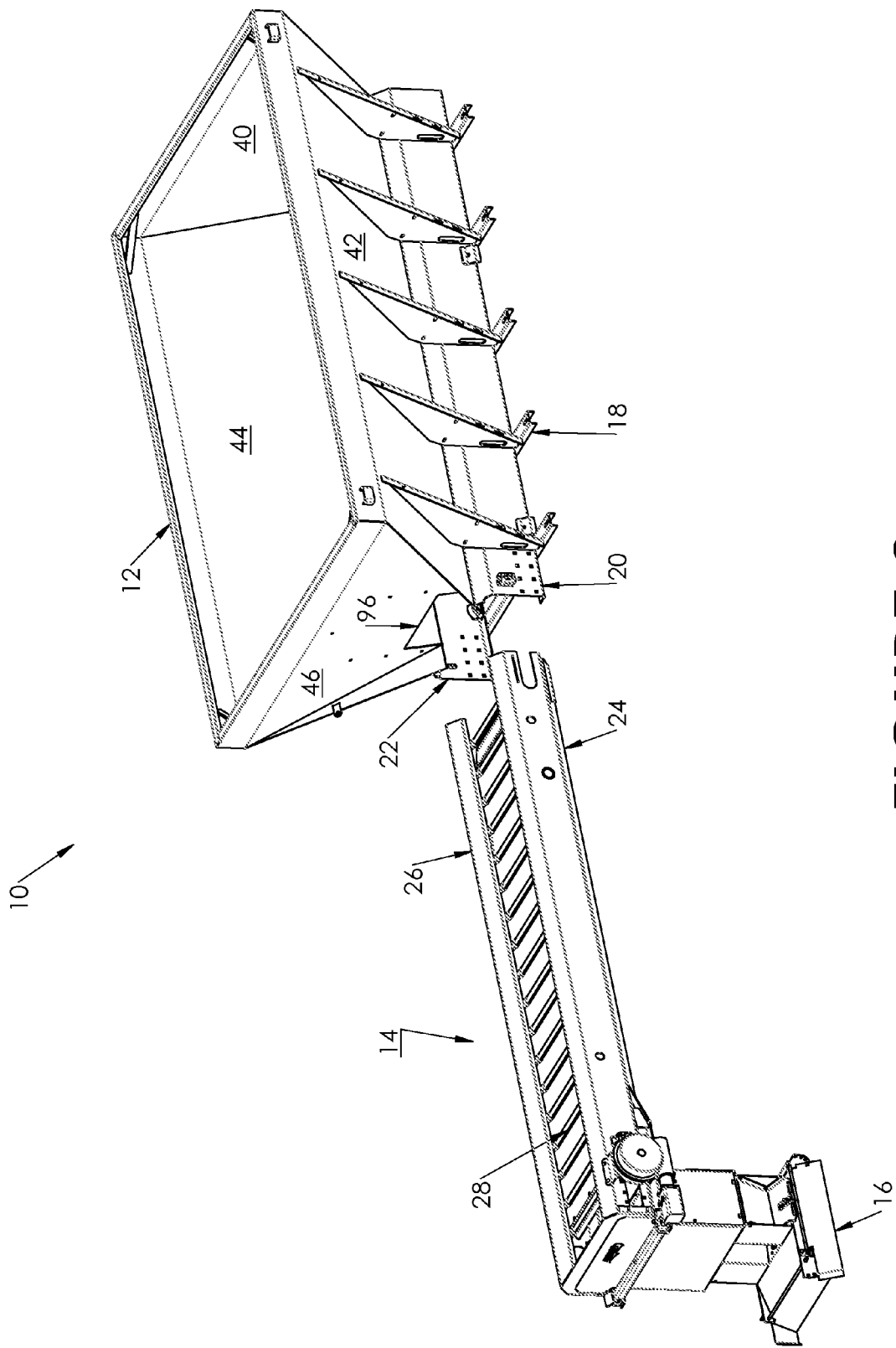
FIG. 2 is an exploded rear perspective view of the spreader assembly of FIG. 1.
Figure 3:
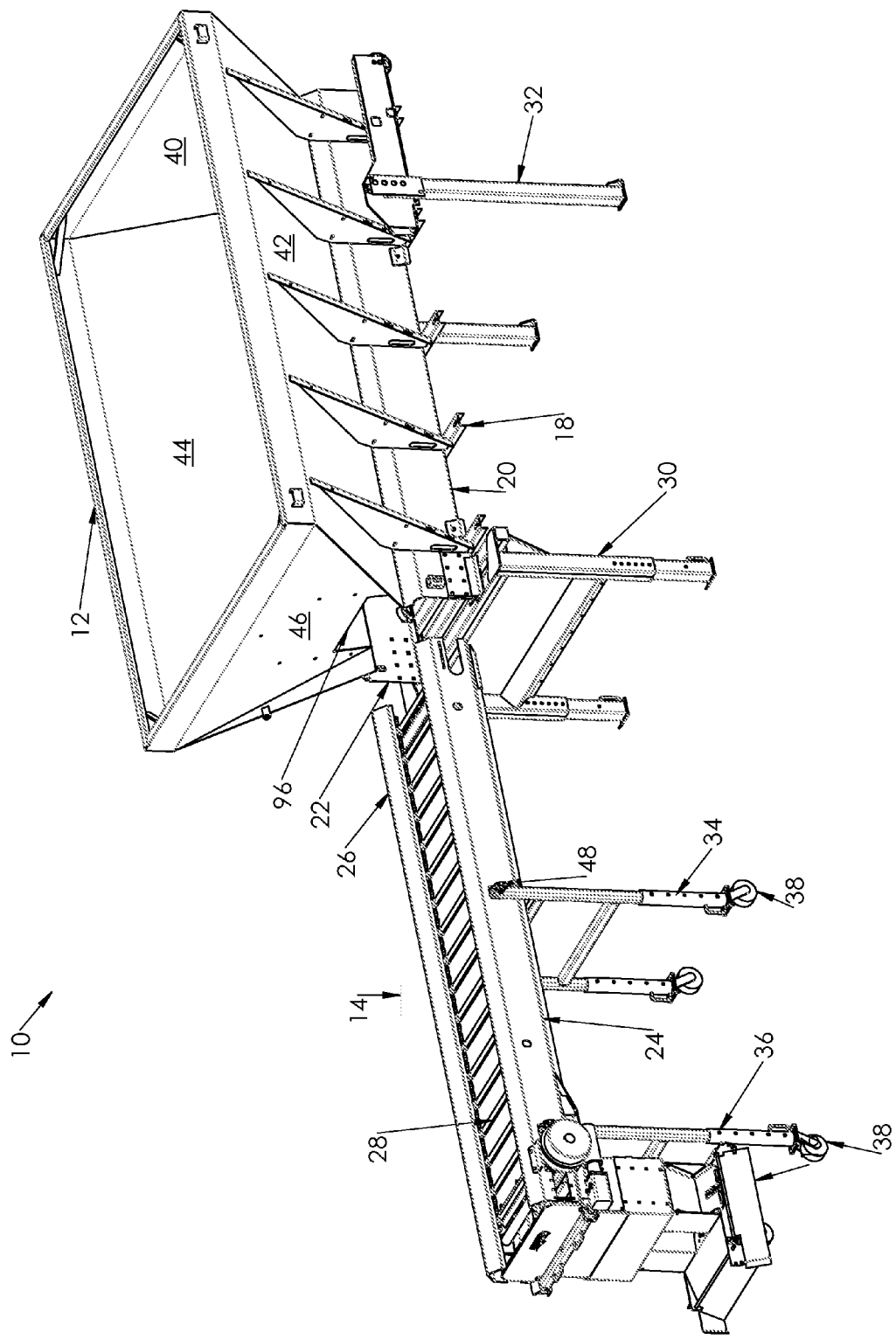
FIG. 3 is an exploded rear perspective view of the spreader assembly of FIG. 1 resting on support legs.
Figure 4:
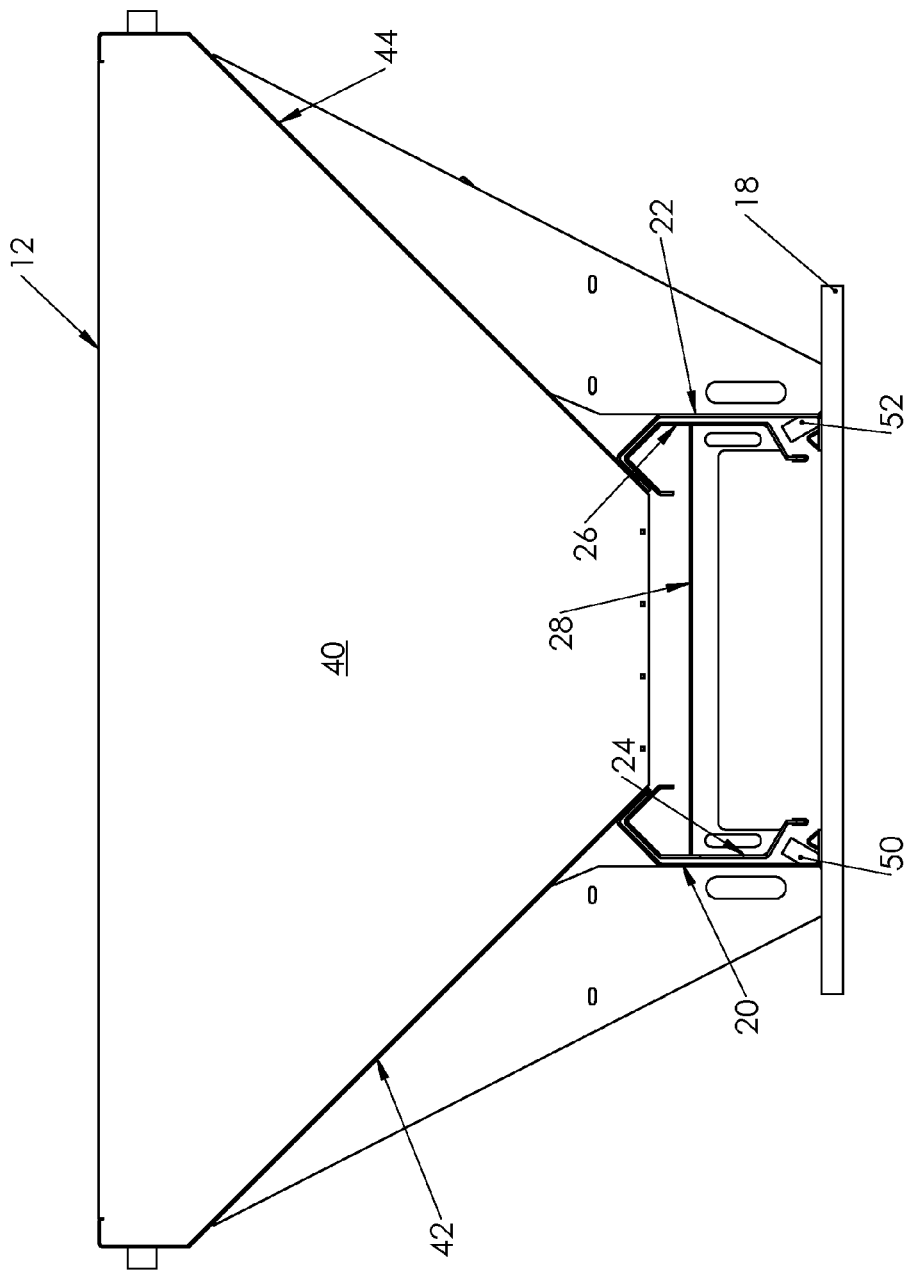
FIG. 4 is a front elevational view of the spreader assembly of FIG. 1.

As shown in FIGS. 1-3, a spreader assembly 10 may include a hopper 12 having an open top configured to receive a spreadable material and a removable material transportation cartridge 14 disposed in a bottom portion of hopper 12. Cartridge 14 may have a spreader 16 configured for receiving the spreadable material at or near a rear end of cartridge 14. Cartridge 14 may be inserted into hopper 12 via an opening 96 in a rear wall 46 of hopper 12. Spreader assembly 10 may be mounted in a bed 25 of a truck 15, for example. Hopper 12 may be configured with a plurality of angled walls 40, 42, 44, 46 that are adapted for funneling a spreadable material downward onto a material transportation mechanism such as conveyor 28 of cartridge 14, which in turn feeds the spreadable material to spreader 16, which may spread the spreadable material over a desired working surface such as a roadway, for example. Hopper 12 may include a plurality of support members 18 on an underside thereof to facilitate mounting spreader assembly 10 to truck 15 or other suitable wheeled vehicle.

As shown in FIG. 3, cartridge 14 may be supported on a plurality of legs 34, 36 having wheels 38 which are adaptable for positioning cartridge 14 at a suitable height and alignment for insertion into hopper 12. Cartridge 14 may include slides 24 and 26 which may be sized and shaped so as to be slideable into corresponding rails 20 and 22 of hopper 12. Hopper 12 may be placed on legs 30 and 32 or other suitable support members when not installed on a wheeled vehicle.

Figure 5:
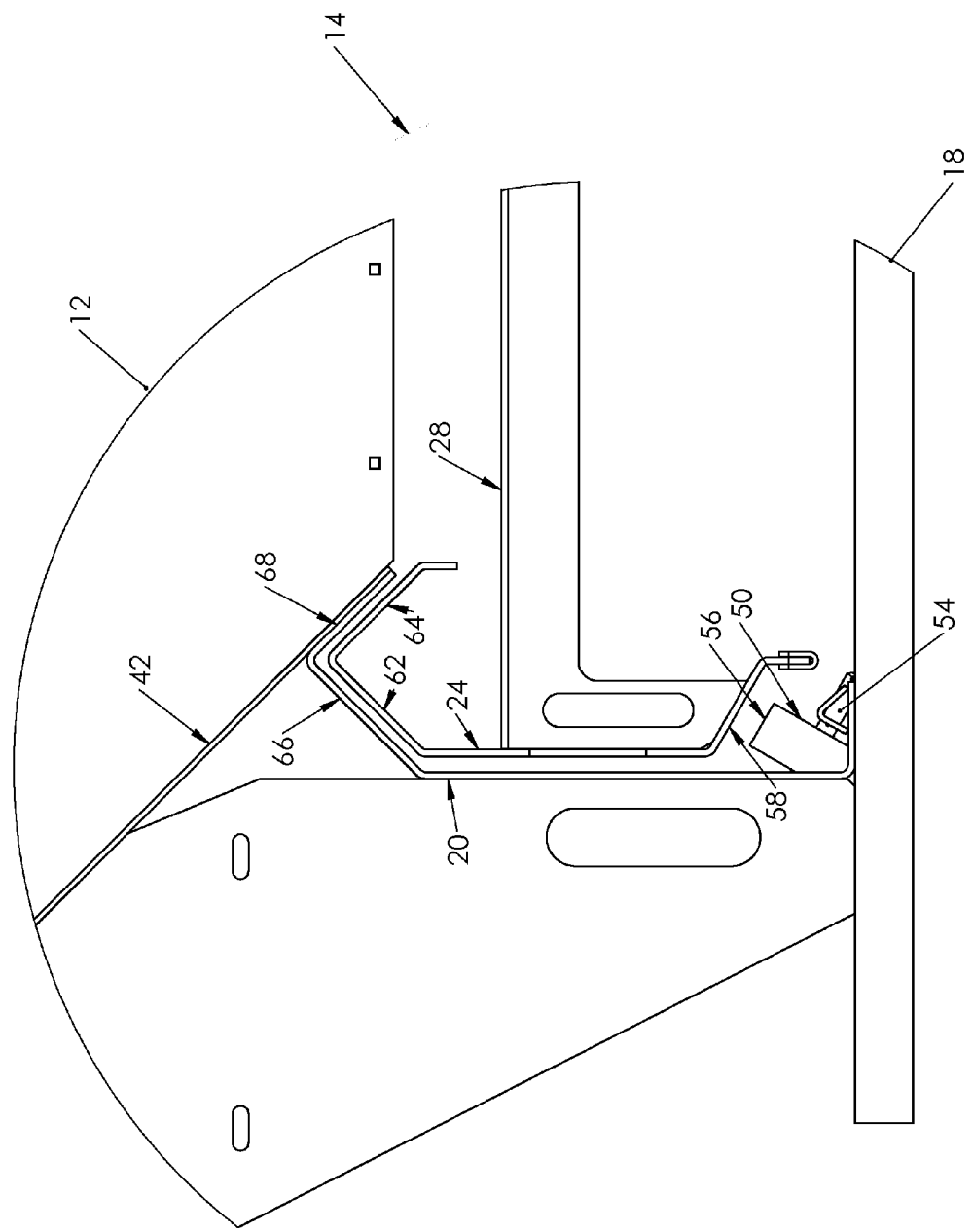
FIG. 5 is an enlarged front elevational view of a portion of the spreader assembly of FIG. 1.
Figure 10:
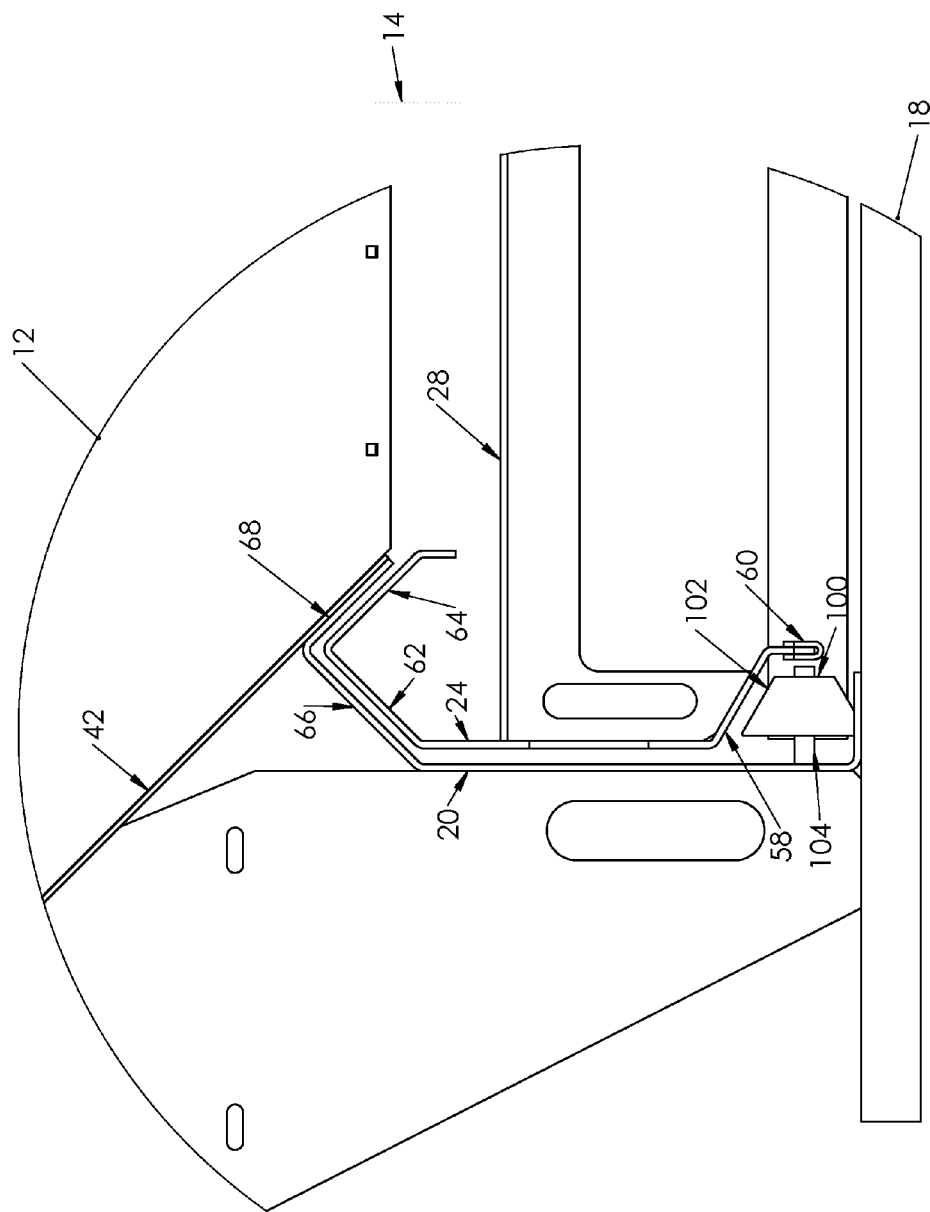
FIG. 10 is an enlarged front elevational view of a portion of the spreader assembly of FIG. 1 with an alternate type of roller.

As shown in FIGS. 4, 5, and 6A-6C, a plurality of rollers 50, 52, 80, 81 may be provided in hopper 12 to facilitate insertion and removal of cartridge 14. Rollers 50, 52, 80, 81 may be installed on shafts 54 or other suitable mounts, such as bearings, for example. As shown for roller 50 in FIG. 5, in some embodiments, each of the rollers may be installed such that its axis and/or its roller surface 56 is oriented at a non-horizontal angle that is substantially the same angle as a bearing surface 58 of slide 24 to facilitate rolling engagement of roller 50 with bearing surface 58 of slide 24. Rollers 52, 80, 81 may be similarly installed with respect to angled bearing surfaces on slides 24, 26, respectively. In some embodiments as shown in FIG. 10, rollers such as roller 100 may be employed in which the axis about which roller 100 rotates (e.g., shaft 104) may be substantially horizontal but the roller surface 102 configured for engaging the bearing surfaces of slides 24, 26 (e.g., surface 58) may be non-horizontal. Alternatively, in some embodiments, some or all of the roller surfaces of rollers 50, 52, 80, 81 and the corresponding bearing surfaces of slides 24, 26 may be horizontal. In some embodiments, a combination of horizontal and non-horizontal roller surfaces and corresponding bearing surfaces may be used. Although two sets of rollers are shown (one forward set 50, 52 and one rear set 80, 81), fewer or more than two rollers per side may be employed, depending on size and weight considerations, for example. As shown in FIG. 5, slide 24 may include flanges 62 and 64 on an upper portion thereof which may be shaped and sized so as to be received between guide members 66 and 68 of rail 20, which helps to keep cartridge 14 centered within hopper 12. A similar flange and guide configuration may be provided for rail 22 and slide 26. A stiffener 60 may be provided on a leading portion of a lower flange of slide 24 and slide 26 to help protect against damage if slides 24 and 26 are rested on the ground or other surface when not in use.

Figure 6A:
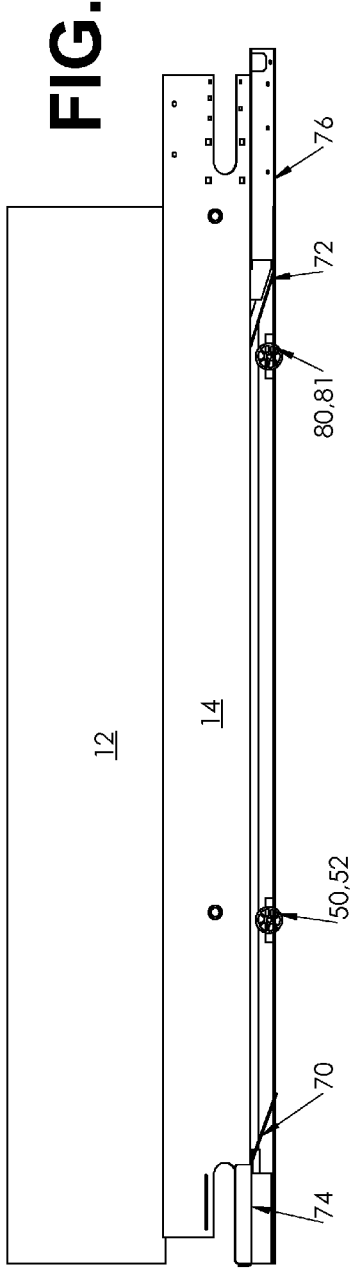
FIG. 6A is a schematic side view of the spreader assembly of FIG. 1 in which the removable material transportation cartridge is shown in a fully inserted position.
Figure 6B:
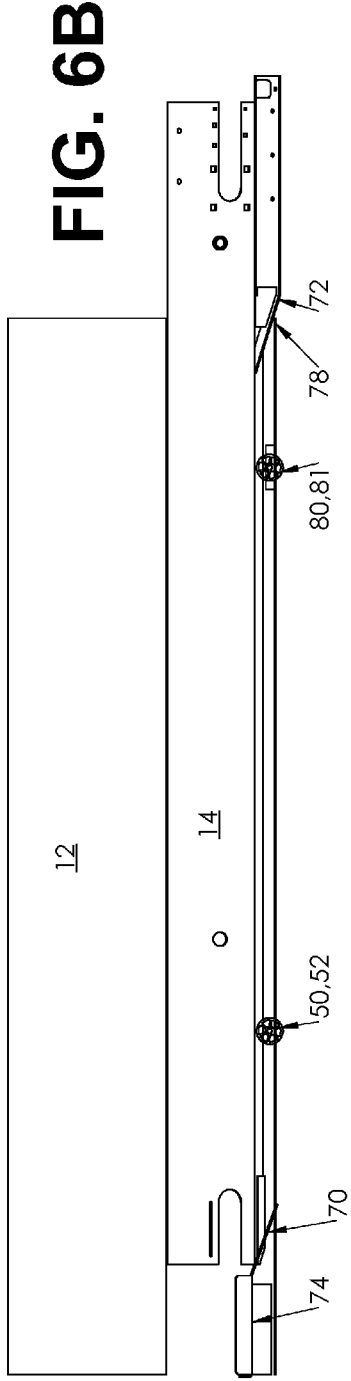
FIG. 6B is a schematic side view of the spreader assembly of FIG. 1 in which the removable material transportation cartridge is shown in a first partially inserted position.
Figure 6C:
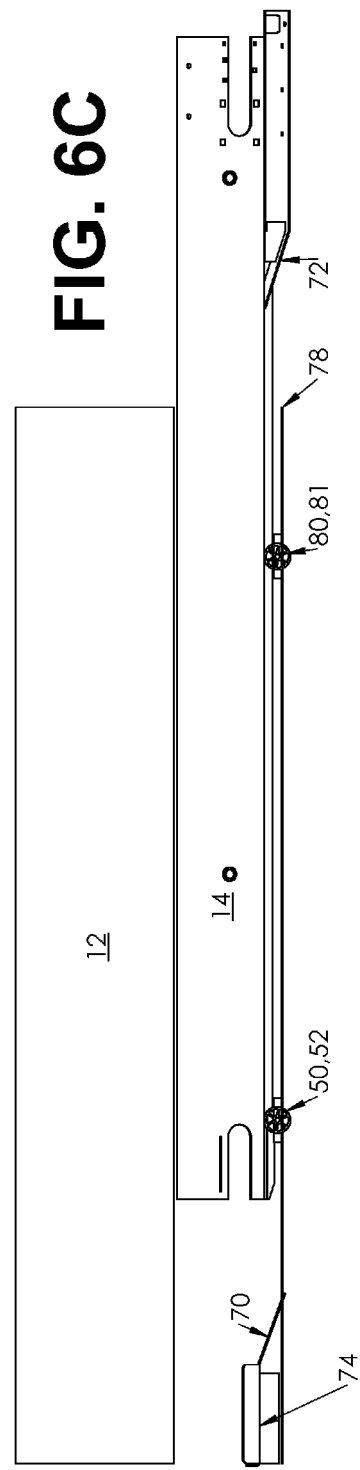
FIG. 6C is a schematic side view of the spreader assembly of FIG. 1 in which the removable material transportation cartridge is shown in a second partially inserted position.
Figure 7:
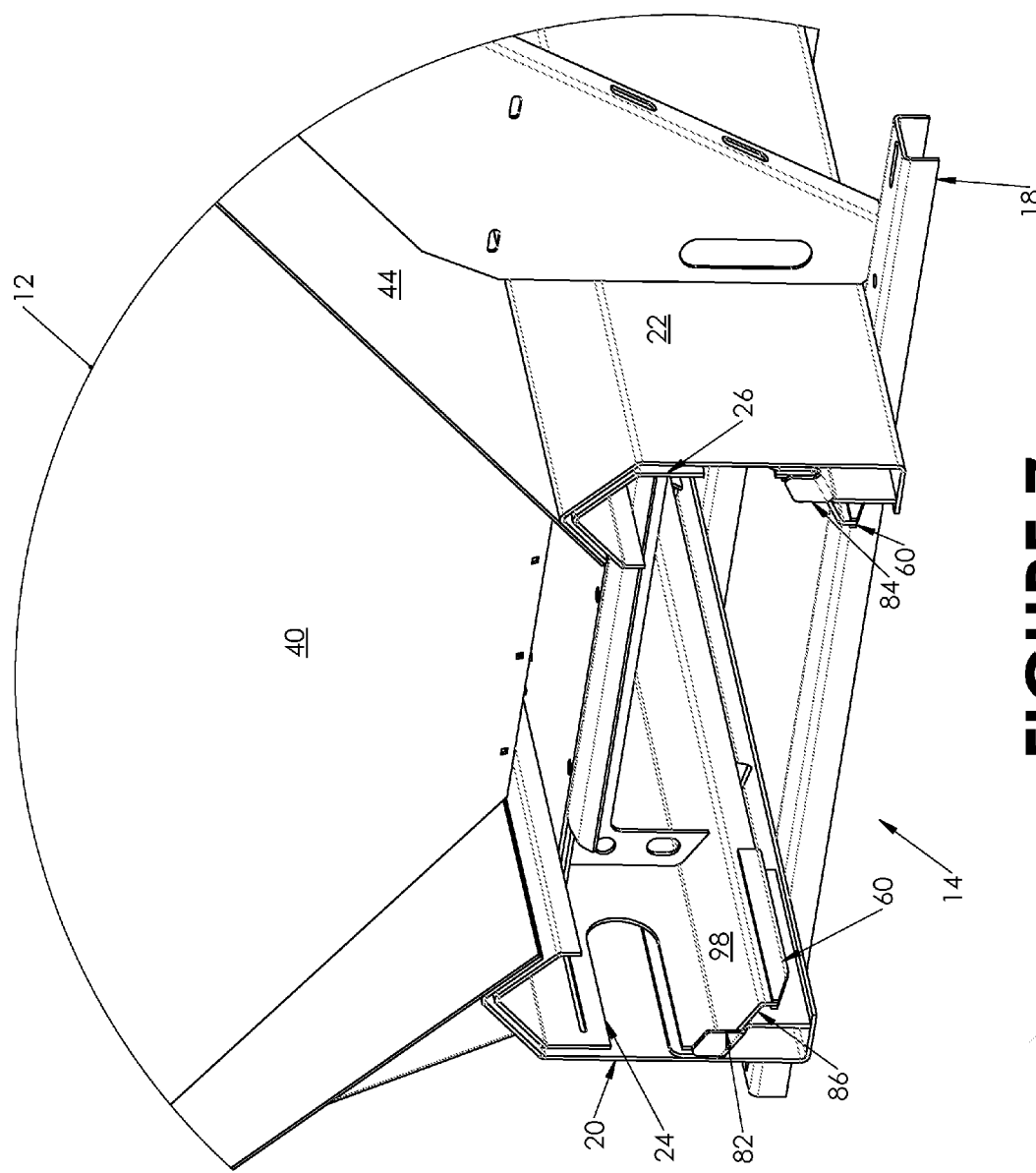
FIG. 7 is a front perspective view of a front portion of the spreader assembly of FIG. 1 in which the removable material transportation cartridge is shown in the fully inserted position of FIG. 6A.
Figure 8:
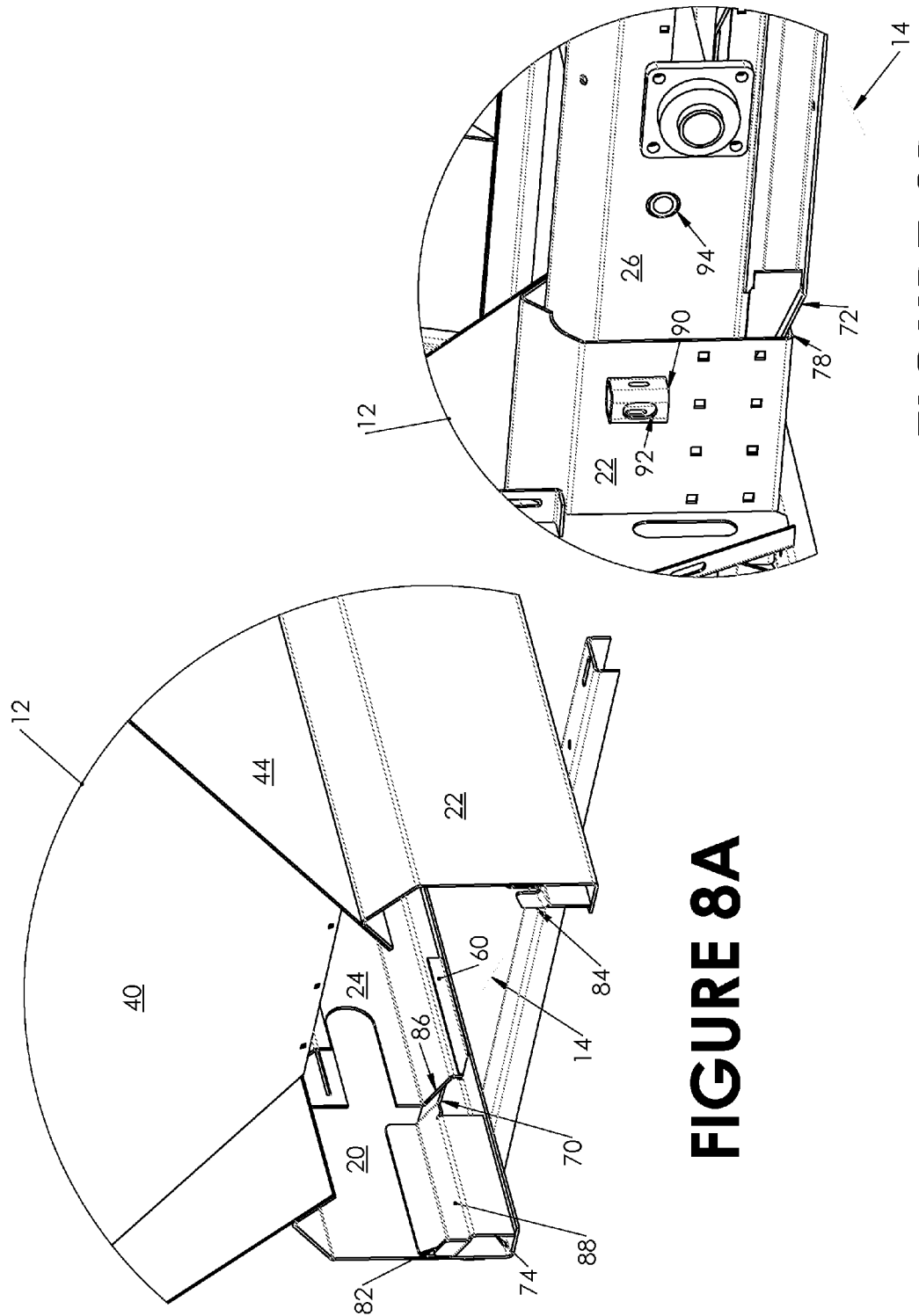
FIG. 8A is a front perspective view of a front portion of the spreader assembly of FIG. 1 in which the removable material transportation cartridge is shown in the first partially inserted position of FIG. 6B.
FIG. 8B is a rear perspective view of a rear portion of the spreader assembly of FIG. 1 in which the removable material transportation cartridge is shown in the first partially inserted position of FIG. 6B.
Figure 9:
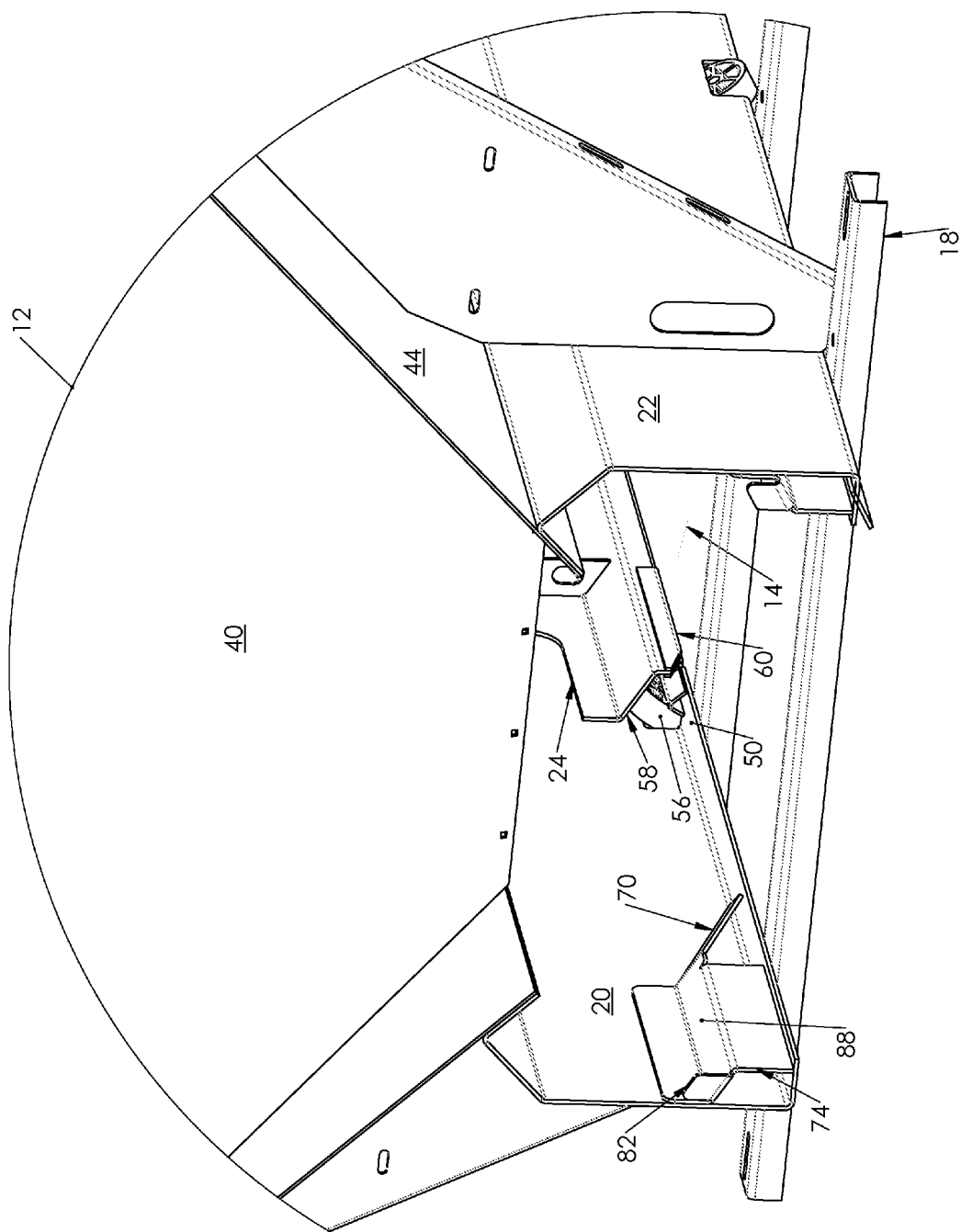
FIG. 9 is a front perspective view of a front portion of the spreader assembly of FIG. 1 in which the removable material transportation cartridge is shown in the second partially inserted position of FIG. 6C.

As shown in FIGS. 6A, 6B, and 6C, hopper 12 and cartridge 14 may include ramps 70 and 72, respectively, which along with rollers 50, 52, 80, 81 help facilitate insertion and removal of cartridge 14 in hopper 12. In a fully inserted position as shown in FIG. 6A, cartridge 14 is not engaged with rollers 50, 52, 80, 81. Rather, in this position, front and rear portions of cartridge 14 rest on front rests 74 and rear rests 76, respectively, of hopper 12. As cartridge 14 is removed from hopper 12, as shown in FIG. 6B and FIG. 8A, ramps 70 and 72 guide cartridge 14 downward (with leading edge 86 of cartridge 14 engaged with ramp 70, and trailing edge 78 of hopper 12 engaged with ramp 72) until cartridge 14 is engaged with rollers 50, 52, 80, 81 as shown in FIG. 6C and FIG. 9. As shown in FIG. 7, in the fully inserted position, the leading edge 86 of cartridge 14 is engaged with stops 82 and 84 of hopper 12. As shown in FIG. 8B, rail 22 may include a boss 90 having a hole 92 therein, and slide 26 may have a hole 94 therein. Rail 22 and slide 26 may be configured such that holes 92 and 94 are aligned with each other when cartridge 14 is in the fully inserted position, and a pin, such as pin 48 from leg stand 34, for example, may be inserted through holes 92 and 94 in order to lock cartridge 14 in place within hopper 12. A similar locking pin arrangement may be provided for rail 20 and slide 24. Of course, other locking mechanisms may be used as well, such as detents, clamps, cogs, or the like.

Referring again to FIGS. 4 and 5, in some embodiments, the non-horizontal angled orientation of rollers 50, 52, 80, 81 and their respective bearing surfaces of slides 24, 26 not only helps to facilitate insertion and removal of cartridge 14 in hopper 12 as described above, but it also helps to minimize or substantially prevent residual spreadable material from remaining on rollers 50, 52, 80, 81. With this angled configuration, most if not all residual spreadable material that may come in contact with rollers 50, 52, 80, 81 during operation will fall off of rollers 50, 52, 80, 81 due to gravity. Similarly, the contact surfaces of front rests 74 and rear rests 76 on which slides 24, 26 are engaged in the fully inserted position (see, e.g., contact surface 88 of front rest 74 in FIG. 8A and FIG. 9), as well as other exposed surfaces of slides 24, 26 (see, e.g., surface 98 of slide 24 in FIG. 7) and rails 20, 22 that are exposed to the spreadable material, may be configured at a non-horizontal angle to help minimize or substantially prevent residual spreadable material from remaining on such surfaces. Some spreadable materials, such as salt or other chemicals, for example, can be very corrosive and abrasive and therefore detrimental to the condition and service life of cartridge 14 and hopper 12 if allowed to remain thereon following use. Non-horizontal angled configurations of rollers 50, 52, 80, 81 and other exposed surfaces of rails 20, 22 and slides 24, 26 as described herein help to minimize or avoid such corrosion and abrasion problems and therefore extend the life of such equipment.

Although cartridge 14 is shown as having a conveyor 28 as its material transportation mechanism, cartridge 14 may have any suitable material transportation mechanism, such as an auger, worm screw, or other suitable mechanism for receiving a spreadable material from hopper 12 and conveying it toward spreader 16. In some embodiments, multiple cartridges 14 having different material transportation mechanisms, each of which is particularly suited for a different type of spreadable material, may be configured to fit the same hopper 12. Thus, when a different material transportation mechanism is desired for a given job, the existing cartridge 14 may be easily and quickly removed from hopper 12, and the appropriate cartridge 14 having the desired material transportation mechanism may be easily and quickly inserted into hopper 12.

In the embodiments described above, rails 20 and 22 are described as part of hopper 12, and slides 24 and 26 are described as part of cartridge 14 which are insertable into and removable from rails 20 and 22. Persons of ordinary skill in the art will appreciate that the foregoing arrangement may be switched, such that rails 20 and 22 may be part of cartridge 14, and slides 24 and 26 may be part of hopper 12. Similarly, although rollers 50, 52, 80, 81 are described above as being part of hopper 12 for engagement with bearing surfaces of cartridge 14, such rollers may instead (or in addition) be part of cartridge 14 for engagement with bearing surfaces on hopper 12. Additionally, in some embodiments, such rollers may remain in contact with the respective bearing surfaces during normal operation of spreader assembly 10, regardless of whether such rollers are mounted to hopper 12 or cartridge 14, and regardless of whether such roller surfaces and the respective bearing surfaces have a horizontal or non-horizontal orientation.

The embodiments described herein are some examples of the current invention. Various modifications and changes of the current invention will be apparent to persons of ordinary skill in the art. Among other things, any feature described for one embodiment may be used in any other embodiment. The scope of the invention is defined by the attached claims and other claims to be drawn to this invention, considering the doctrine of equivalents, and is not limited to the specific examples described herein.

What is claimed is:

1. A spreader assembly comprising:
   a hopper configured for receiving a spreadable material, said hopper comprising at least one roller having a roller surface;
   a cartridge slidably and removably disposed in a lower portion of said hopper, said cartridge comprising
      at least one bearing surface configured for rolling engagement with said roller surface of said at least one roller, and
      a material transportation mechanism configured for receiving said spreadable material from said hopper and moving said spreadable material toward a spreader; and
   said spreader configured for receiving said spreadable material from said material transportation mechanism and spreading said spreadable material onto a target surface.

2. The spreader assembly of claim 1 wherein said hopper comprises a pair of spaced apart rails, wherein said at least one roller comprises a forward roller and a rear roller disposed within each of said rails, wherein said cartridge comprises a pair of spaced apart slides slidably disposed in said spaced apart rails, and wherein said at least one bearing surface comprises a non-horizontal bearing surface on each of said spaced apart slides.

3. The spreader assembly of claim 1 wherein said roller surface is disposed at a non-horizontal angle.

4. The spreader assembly of claim 1 wherein said at least one roller is configured for rotation about a substantially horizontal axis.

5. The spreader assembly of claim 4 wherein said roller surface is disposed at a non-horizontal angle.

6. The spreader assembly of claim 1 wherein said roller surface and said at least one bearing surface are disposed at substantially the same non-horizontal angle.

7. The spreader assembly of claim 1 wherein said at least one roller and said at least one bearing surface comprise a combination of horizontal and non-horizontal roller surfaces and corresponding bearing surfaces.

8. The spreader assembly of claim 1 wherein said cartridge is insertable into and removable from said hopper via an opening in a rear wall of said hopper.

9. The spreader assembly of claim 1 wherein said cartridge comprises a plurality of legs each having a wheel, said plurality of legs being adaptable for positioning said cartridge at a suitable height and alignment for insertion into said hopper.

10. The spreader assembly of claim 1 wherein:
    said cartridge comprises a pair of spaced apart slides each having a flange; and
    said hopper comprises a pair of spaced apart rails each having a guide member configured for receiving a respective one of said flanges.

11. The spreader assembly of claim 1 wherein each of said hopper and said cartridge comprises at least one ramp configured to facilitate insertion and removal of said cartridge with respect to said hopper.

12. The spreader assembly of claim 11 comprising a fully inserted position in which said cartridge is not engaged with said at least one roller and wherein front and rear portions of said cartridge respectively rest on front and rear rests of said hopper.

13. The spreader assembly of claim 12 wherein said front and rear rests comprise respective contact surfaces configured at a non-horizontal angle.

14. The spreader assembly of claim 1 wherein:
    said cartridge comprises at least one slide having a first hole therein;
    said hopper comprises at least one rail configured to receive said at least one slide, said at least one rail having a second hole therein;

said cartridge having a fully inserted position in which said first and second holes are aligned and configured to receive a pin configured to lock said cartridge in place with respect to said hopper.

15. The spreader assembly of claim 1 wherein said material transportation mechanism is selected from conveyor, auger, and worm screw.

16. A spreader assembly comprising:
a hopper configured for receiving a spreadable material, said hopper comprising
  a first rail having a first front roller and a first rear roller, and
  a second rail spaced apart from said first rail and having a second front roller and a second rear roller,
  each of said rails having a guide member;
a cartridge configured for insertion into and removal from said hopper, said cartridge comprising
  a first slide having a first bearing surface configured for rolling engagement with said first front roller and said first rear roller,
  a second slide having a second bearing surface configured for rolling engagement with said second front roller and said second rear roller,
  each of said bearing surfaces being non-horizontal,
  each of said slides having a flange configured to be received by one of said guide members, and
  a material transportation mechanism configured for receiving said spreadable material from said hopper; and
a spreader configured for receiving said spreadable material from said material transportation mechanism and spreading said spreadable material onto a target surface;
wherein each of said rails and said slides comprises at least one ramp configured to facilitate said insertion and said removal; and
wherein said cartridge comprises a fully inserted position in which said cartridge is not engaged with said rollers and wherein front and rear portions of said cartridge respectively rest on non-horizontal front and rear rests of said hopper.

17. A spreader apparatus comprising:
a hopper configured for receiving a spreadable material;
a removable cartridge configured for sliding engagement with said hopper and having a material transportation mechanism configured for receiving said spreadable material from said hopper; and
a spreader configured for receiving said spreadable material from said material transportation mechanism and spreading said spreadable material onto a target surface;
wherein one of said hopper and said cartridge comprises a roller having a roller surface; and
wherein the other of said hopper and said cartridge comprises a bearing surface configured for rolling engagement with said roller surface.

18. The spreader apparatus of claim 17 wherein said roller surface and said bearing surface are disposed at a non-horizontal angle.

19. The spreader of claim 18 wherein other surfaces of said cartridge that are exposed to the spreadable material are configured at a non-horizontal angle.

20. The spreader of claim 19 wherein at least one of said hopper and said cartridge includes a ramp configured to facilitate insertion and removal of said cartridge with respect to said hopper.

* * * * *